May 27, 1952 G. WILLIAMS ET AL 2,598,201
APPARATUS FOR TREATING VEHICLE BODIES
Filed June 22, 1949 7 Sheets-Sheet 6

Inventors
Gethin Williams
Alexander P. Fowler
By
Attorney

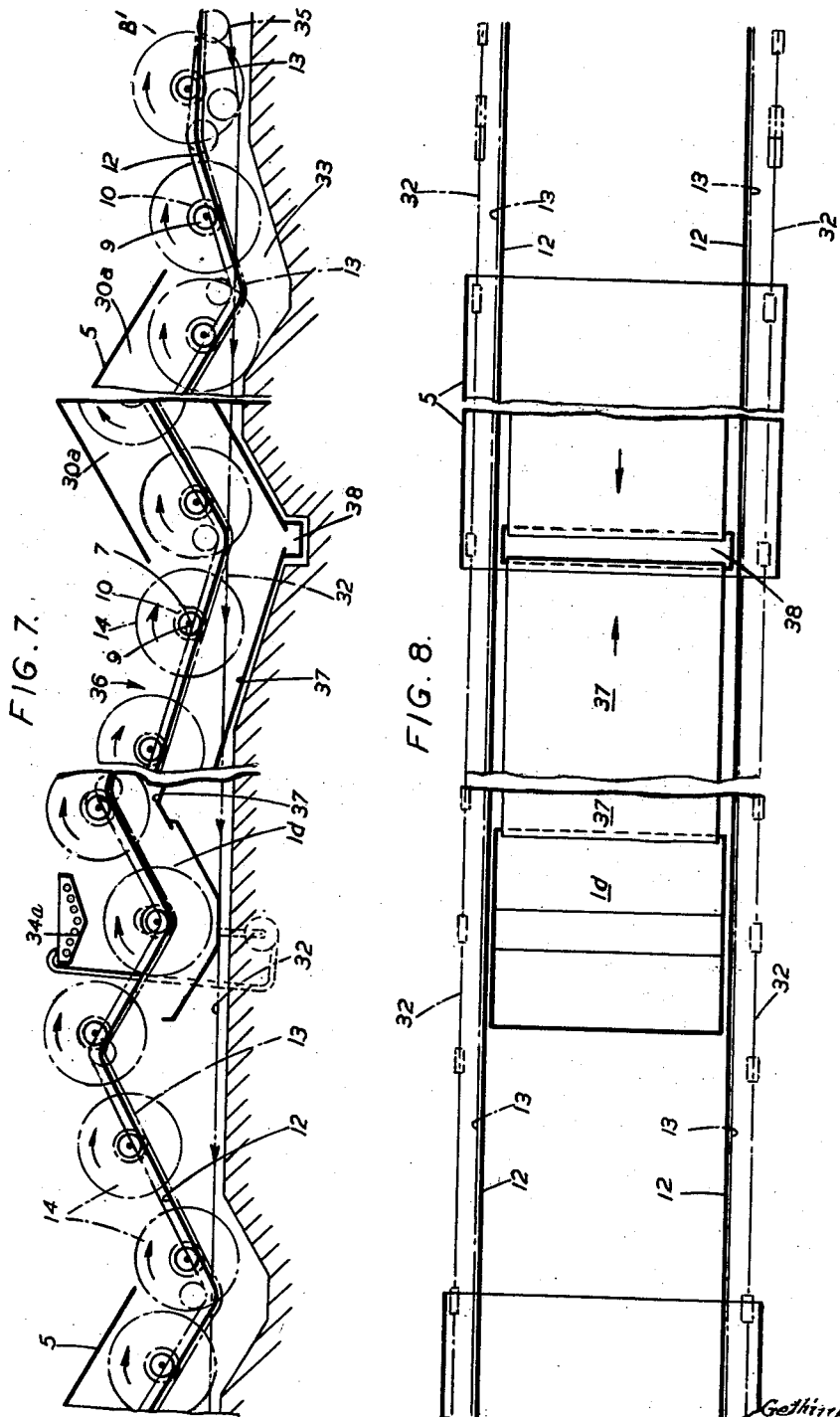

Patented May 27, 1952

2,598,201

UNITED STATES PATENT OFFICE 2,598,201

APPARATUS FOR TREATING VEHICLE BODIES

Gethin Williams, Oxford, and Alexander Proud Fowler, London, England

Application June 22, 1949, Serial No. 100,724 In Great Britain January 6, 1944

16 Claims. (Cl. 118—416)

This invention relates to apparatus for cleaning, rustproofing, priming and painting sheet metal vehicle bodies, and is a division of U. S. patent application Serial No. 8,835, filed on February 17, 1948.

One of the present methods to-day of, for example, painting a vehicle body, particularly where such bodies are being produced on a quantity production basis, is to mount the body on a conveyor which carries it through one or a series of booths or stages where the paint is applied by means of a paint spray gun under the control of an operator, whence the bodies pass to one or a series of ovens wherein the paint is baked on the body. Where a construction of the so-called unitary or combined body and chassis is used, difficulty has been experienced in ensuring an dequate supply of paint to all parts of the combination and it is found that the box-section structure at the base of the vehicle created by the assembly of the body and its chassis, particularly the interior thereof, is frequently untreated with the consequent danger of fairly rapid rusting when the vehicle is put into service. Furthermore, the several crevices and excrescences of the body are not always found to be properly painted. In order to improve the rust resisting properties of sheet metal bodies and chassis they may be treated by any well known chemical processes which provide a chemical coating to the sheet metal to inhibit corrosion. After this treatment a paint priming coat is applied and baked and finally the paint colour coat is applied and again baked.

It is to be understood that the term "vehicle body" in this specification and in the appended claims means bodies for motor car vehicles and similar bodies intended for mounting on airborne or waterborne vehicles all being vehicles in which passengers or goods are transported whether or not a chassis is incorporated in the body. Such bodies include relatively small compartments for the accommodation, for example, of sliding windows and which are a source of corrosion from the interior, which corrosion ultimately extends through the outer wall of the body.

One of the objects of the present invention is to provide an improved apparatus for treating, for example, cleaning, rustproofing, priming and painting sheet metal vehicle bodies where such are manufactured by so-called quantity production methods, such improved apparatus ensuring proper treatment of all parts of the body, at the same time ensuring a more uniform treatment and particularly for the priming and painting treatments, dispensing with the usual spray booths, with their ventilating systems and eliminating the substantial loss of paint, in a finely atomised form, which takes place by being drawn out of the booth and passed to waste.

Further objects of the present invention are to devise means of obtaining an even prime coating on the vehicle body, and to effect the preparatory operations of cleaning and applying a protective coating so that not only the outer surfaces are treated, but also the interior surfaces to which reference has already been made.

Yet a further object is to devise an apparatus capable of effecting a continuous process, simple and economical in operation, for effecting in succession the preparation of the body for the prime coating and the application thereof.

Apparatus for treating sheet metal vehicle bodies, for example cleaning, rustproofing, priming and painting, constructed according to the present invention, comprises rotatable means, preferably in the form of a cradle-like structure, for mounting a vehicle body, the axis of rotation thereof being coincident with a longitudinal axis intersecting a body when carried by said mounting, actuating means for said mounting, a series of tanks, a conveyor for said mounting disposed to advance the mounting over the series of tanks, the axis of rotation of the mounting being disposed at right angles to the direction of said advance, and means for applying a treating liquid to the rotating vehicle body while disposed over each tank.

The treatment of each body may be by dipping or by spraying or by flow coating by means of suitable nozzles, or by simultaneous dipping and spraying or flow coating, and rotation ensures an even distribution of the treating liquid by flowing around the surfaces, entering the crevices and normally blind areas, permitting excess treatment fluid to drip off and be recovered for further use and to ensure uniformity of baking a long series of bodies as they pass through the ovens.

In order that the invention may be more clearly understood a preferred embodiment will now be described as applied to the process of first applying a cleaning or pickling liquid to a passenger carrying vehicle body and then applying the protective chemical coating and prime coating, with reference to the accompanying diagrammatic drawings.

In the drawings:

Figure 3a is a continuation of the elevation shown in Figure 3, showing a cross over between the conveyor carrying the vehicle body and cradle through the series of tanks and a slower moving conveyor which moves the cradle and body through a drying oven;

Figures 4 and 4a are diagrammatic plan views corresponding to Figures 3 and 3a respectively;

Figure 7 shows in side elevation an extension of the installation illustrated in Figures 3 and 3a, in which extension is incorporated the paint tank in which the vehicle body is provided with a prime coating, and Figure 8 is a plan of that part of the installation shown in Figure 7.

In the drawings like references designate the same or similar parts.

Figure 1:
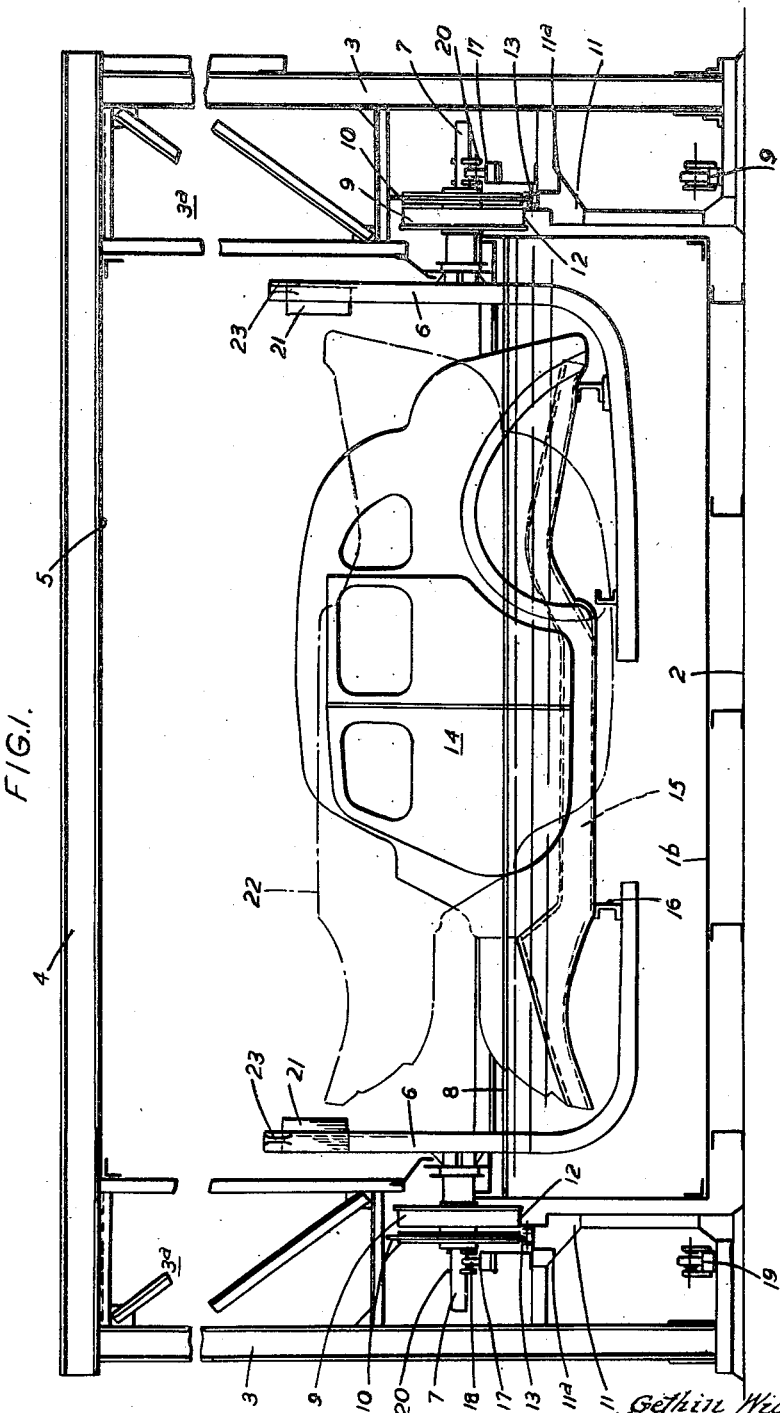
Figure 1 is a transverse sectional elevation taken on the line 1—1 of Figure 3 showing the tank containing a protective chemical coating liquid and the construction of the cradle and means for moving sideways the cradle and a vehicle body incorporating a chassis, so that the latter is simultaneously rotated and advanced along the tank.

The installation illustrated in Figures 3, 3a, 4 and 4a comprises a series of tanks 1, 1a, 1b and 1c. The tank 1 contains a bath of cleaning liquid, which tank is shallow in depth as compared with the height of the body; the tank 1a a rinse, the tank 1b a liquid which produces a protective chemical coating on the cleaned metal and the tank 1c contains a rinse. Each tank is similarly constructed and supported on a floor 2 as clearly illustrated in Figure 1, which floor carries a superstructure comprising spaced stanchions 3, which latter support roof members 4. The stanchions and roof members are shown only in Figure 1 and it will be understood that a series of stanchions and complementary roof members extend for the full length of the installation. A canopy 5 is supported by the roof members and by a framework 3a carried on each of the stanchions 3.

By using shallow baths in the tanks considerably less quantities of such liquids are employed as compared with processes in which the successive stages of treatment of a vehicle body are carried out by completely submerging the body in the several liquids and moreover an advantage arising out of the method of applying a prime coating in accordance with the invention, wherein the vehicle body traverses a shallow bath of the paint, is that being shallow there is substantial elemination of any tendency in the paint to settlement or separation owing to the difference in density of its constituent parts and thereby the troubles arising from settlement and separation in paint are correspondingly eliminated.

In order to transport a series of bodies through the installation at one time, each body is carried on a rotatable mounting which in the embodiment illustrated is a cradle and the series of cradles are conveyed through the installation simultaneously. Each cradle comprises two L-shaped members 6 each rigidly connected to a trunnion 7, the two trunnions 7 of a cradle being in alignment, the line of their common axis being the axis of rotation which is parallel to the surfaces of the several liquids in the different tanks, i. e. horizontal, and also longitudinally intersecting the vehicle body mounted on a cradle. In Figure 1 the surface of the protective coating liquid in the tank 1b is indicated at 8. On each trunnion is a wheel 9 and fixed to each trunnion is a sprocket wheel 10. At the foot of each stanchion 3 is a framework 11 and this framework carries a track 12 which runs outside and parallel with each longitudinal side of the tank, as clearly shown in Figures 4 and 4a, which track may conveniently be formed of channel iron and is disposed to support the respective wheel 9 of the cradle in desired relation with the liquid in the tank.

Figure 5:
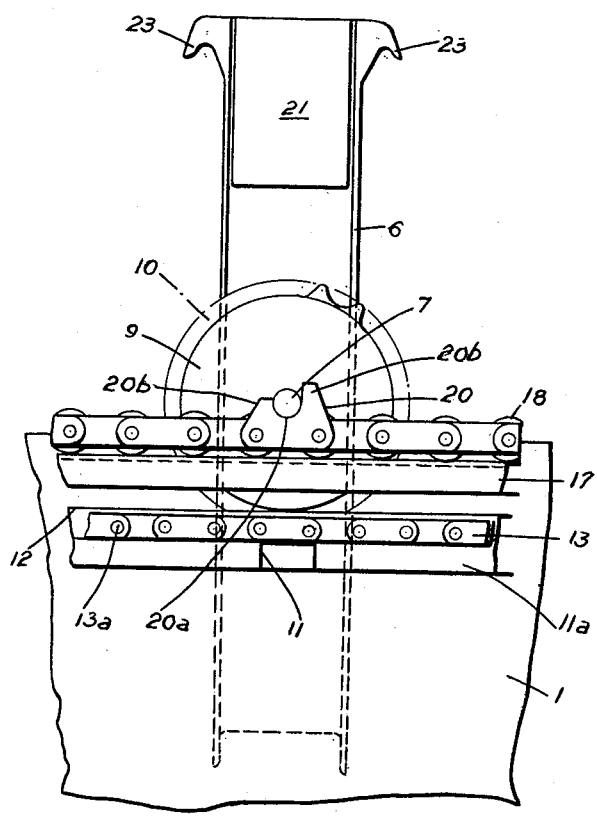
Figure 5 is a fragmentary side elevation of the cradle clearly showing the cradle balancing means and the cradle operating gear.
Figure 6:
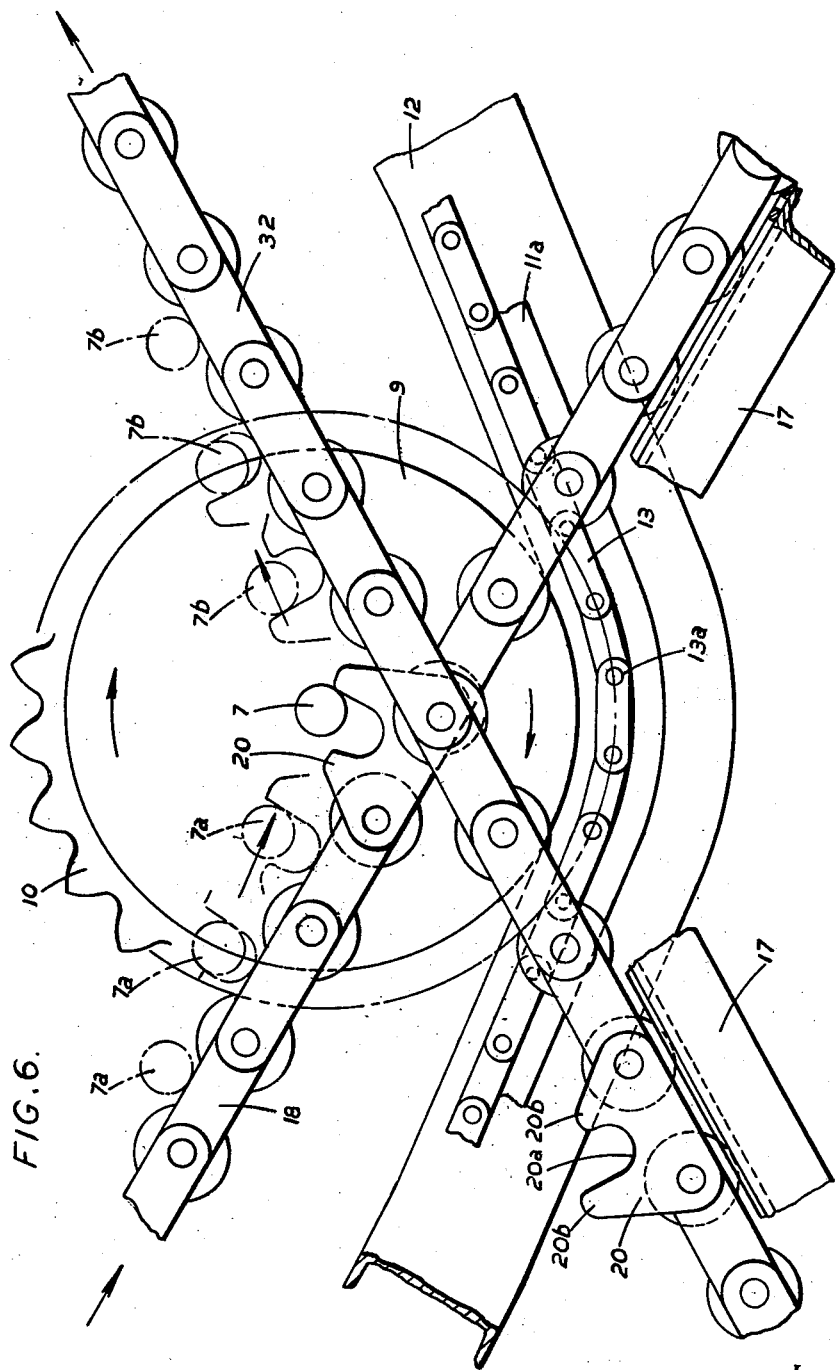
Figure 6 is an elevation to a much larger scale showing clearly the cross over of the conveyors between the last of the series of tanks and the drying oven.

The framework 11 carries longitudinal bars 11a which support a rack 13 (conveniently formed by the hinge pins 13a on a fixed chain, see Figures 5 and 6) for the respective sprockets 10 so that when the L-shaped members are connected it will be seen that a cradle for the vehicle body is provided, which cradle rotates on an axis that is disposed above the surface level 8 of the protecting liquid in the tank 1b, while the cradle depends into the liquid, and if the trunnions 7 are displaced laterally the whole cradle construction will run along the tracks 12 on which the wheels 9 run, while the sprockets 10 will be rotated by reason of this displacement and of their engagement with the respective fixed racks 13, and thereby the cradle as a whole is advanced longitudinally of the installation with regard to the tank, while being continuously rotated so that all parts of the vehicle body follow a cycloidal path lengthwise of the tank.

In order to maintain a predetermined temperature for the liquid in the tank, heating pipes (not shown) may be arranged under each tank or in a tank as will be readily understood.

In the embodiment of the invention under consideration the vehicle body 14 comprises at the bottom a girder construction, indicated at 15, and the vehicle body may be connected to the L-shaped members 6 by stretchers 16, which are detachably secured to the L-shaped members and to the chassis members 15 of the vehicle body in any suitable manner, e. g. by bolting, which will hold the body on the cradle during the rotation of the latter.

It will be observed that when the vehicle body is mounted on the cradle that the ends of the body are juxtaposed to the trunnions 7 so that the body is advanced sideways during rotation.

Figure 2:
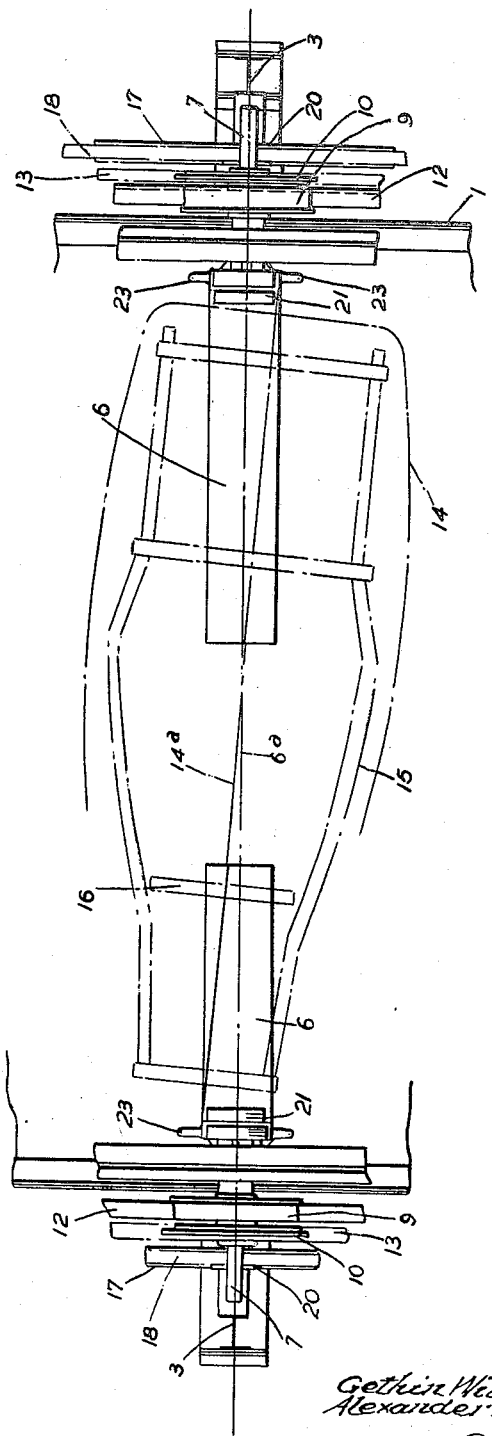
Figure 2 is a fragmentary plan of the apparatus shown in Figure 1 clearly showing the cradle operating means.

As clearly shown in Figure 2 the central longitudinal axis of the vehicle body, indicated by the line 14a, is inclined to the axis of rotation of the cradle, indicated at 6a, in Figure 2. The angle of inclination of the axis line 14a to the axis line 6a is slight and the effect of so displacing the vehicle body is to increase the displacement of the liquid when the body dips into the liquid by alternately submerging the diagonally opposite corners of the body in the bath to a greater extent than they would be if the vehicle body were arranged with the axis 14a coincident with the axis 6a.

In order to produce the sideways travelling of each cradle lengthwise of the series of tanks in the installation, the framework 11 is provided with a top runway 17 for a conveyor chain 18, the conveyor chain being an endless chain and having the return or lower run on runway 19 carried by the framework 11 as most clearly indicated in Figure 1. The cradles are arranged with their axes of rotation at right angles to the path of the conveyor chain 18, while the driving sprockets for the trunnions and conveyor chains are disposed outside the tank, so that they are shielded from the treating liquid.

The conveyor chain is provided at intervals with short plates 20 that include an open axle bearing 20a between two dogs 20b which straddle a trunnion 7 resting in the bearing, as most clearly shown in Figure 5. Therefore, as the conveyor is driven along, pairs of plates 20 on the two conveyor chains simultaneously carry the trunnions of a cradle and the abutting dog pushes the trunnion and causes the cradle to be moved longitudinally of the installation and, through the agency of the sprockets 10 engaging the racks 13, the cradle and vehicle body are simultaneously continuously advanced and rotated. The spacing of the plates 20 along the conveyor is such as to space bodies at such a distance apart as to prevent one body splashing or otherwise interfering with another. The conveyors are actuated by motive means (not shown), the speed of which may be varied to modify the speed of rotation of the vehicle bodies and the rate at which they are advanced.

As a means of preventing sudden angular movements of a cradle due to the asymmetrical disposal of a body about the axis of rotation, the arms 6 may be provided at their free ends with balance weights 21, which steadies the rotation of the body and the cradle about the axis of trunnion.

By such arrangement the vehicle body is smoothly taken through the several baths of liquid until the desired treatment has been effected in each, and it will be noticed that as the body, always moving sideways, is advanced forwardly it is alternately dipped in and raised from each bath of liquid while moving in a cycloidal path.

By so manipulating the body during the preparatory treatment stages first the cleaning liquid is forced to scour all the cavities in the body and withdraw from them any dust or metal particles which otherwise would be retained in them and thereby the protective chemical coating is applied free of such particles and evenly disposed over the body surface, so that a smooth prime coating can be obtained, evenly spread over the whole of the surface of the body on which a final paint is ultimately applied, so that a finished surface can be produced without the necessity of polishing, while great economy in paint is achieved. In Figure 1 is shown in chain lines, indicated at 22, the body 14 in inverted position, and in Figures 3 and 3a the chain line circles 14 indicate a vehicle body.

In order to load the cradle to which the vehicle body is fixed on to the conveyor system, or to remove it at the discharging end, the L-shaped members of the cradle are at their upper parts provided with hooks 23, see Figure 5, which can readily be engaged by any of the well known kinds of overhead transport systems.

Figure 3:
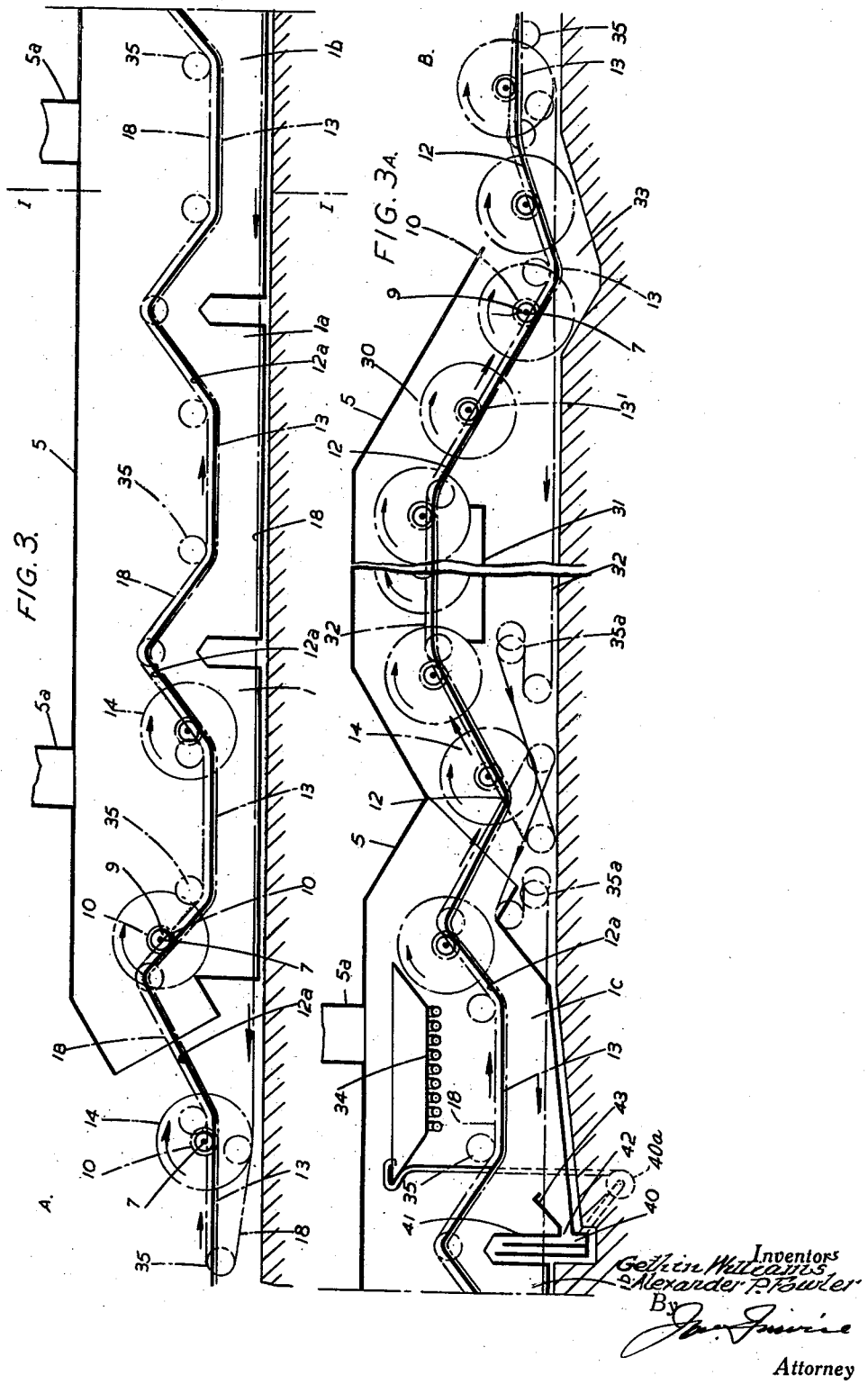
Figure 3 is a part diagrammatic elevation of a conveyor installation, including a series of tanks and means for moving the cradle and vehicle body into and out of each of the tanks in the series in succession.
Figure 4:
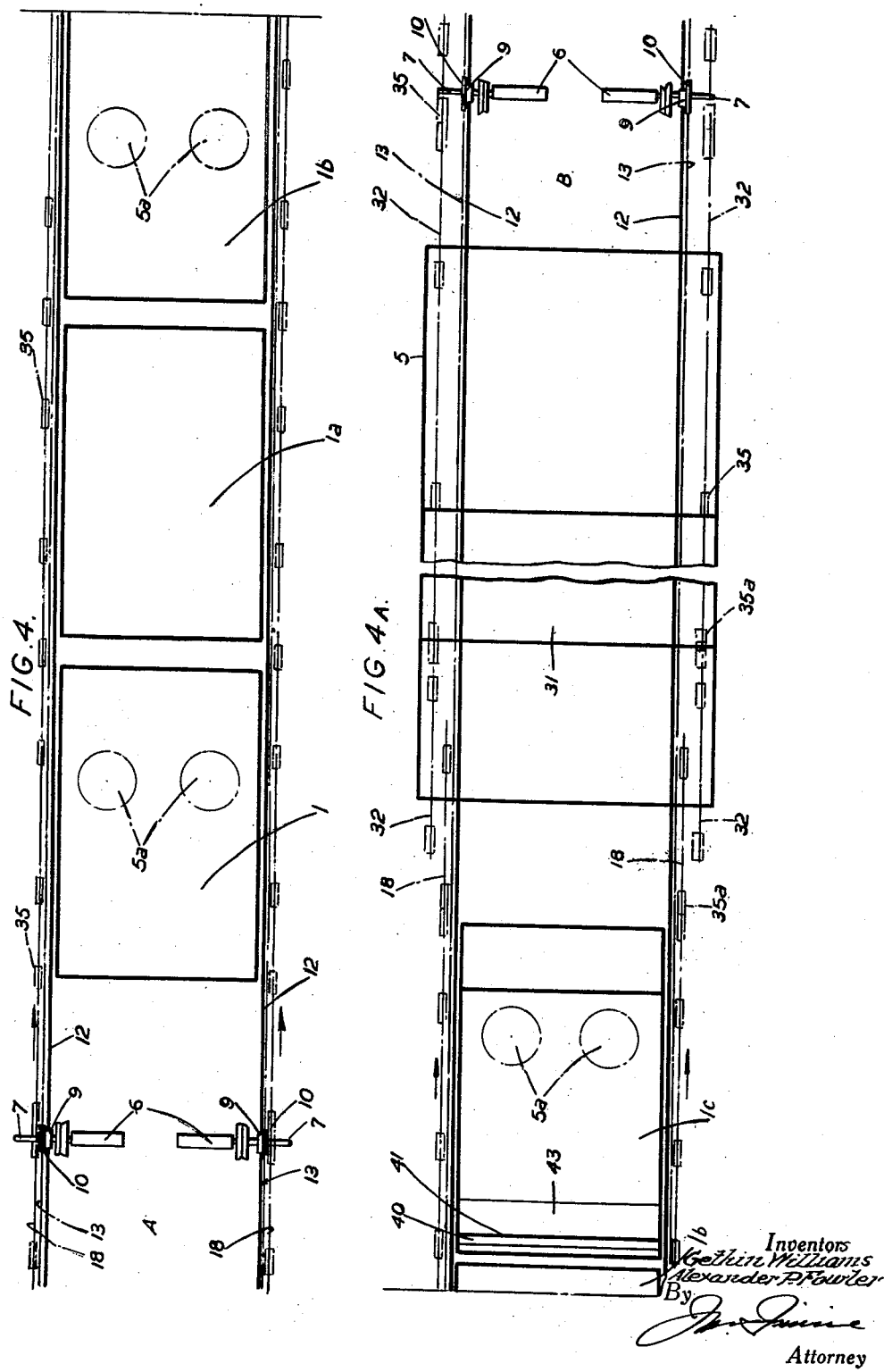

From the foregoing it will be appreciated that in passing a vehicle body through the installation it will be similarly actuated as already explained with regard to the tank 1b, in each of the other tanks, and in order to move a vehicle body from one tank to the next the tracks 12 are sloped upwardly and downwardly as clearly indicated at 12a in Figures 3 and 3a, to form arches at the juxtaposed ends of adjacent tanks. By such an arrangement the wheels of a cradle as it approaches the end of one tank are carried up an incline so that the body is substantially drained while it is still over the tank and because of the contiguous downward slope of the track along which the wheels of a cradle run when entering a tank, the body is gradually lowered at a predetermined peripheral speed into the treating liquid, the speed being a component of the linear speed of the conveyor since the dogs 20b continue to straddle a trunnion 7 between them during the upward and downward movement of a cradle across the bridges 12a.

If it is not required to rotate a vehicle body while it is being transferred from one tank to another, the racks 13 may be omitted in the vicinity of the arches so that the sprockets 10 cease to rotate during the transfer.

In the installation shown in Figures 3, 3a, 4 and 4a, the loading end for the conveyor is indicated at A and the discharge end at B and as already explained cranes of any usual form (not shown) may be employed to dispose a cradle on the conveyor at the loading end or to remove a cradle from the discharging end. The installation illustrated comprises at 30 a drying oven which may have polished interior walls, the roof being a continuation of the canopy 5 and the floor, indicated at 31, so that a tunnel oven is formed in which radiant or convection heat may be applied to the bodies passing therethrough, the means of providing the heat is not indicated in the drawings but the speed of the bodies through the oven must be regulated according to the heat of the oven or the heat regulated according to their speed, in order that the desired heat treatment i. e. baking should be completed before the bodies leave the oven. To this end a second conveyor 32 is provided to carry the bodies through the drying oven and to the discharge end B of the installation, and as clearly shown in Figures 3a and 6 the upper runs of the conveyors 18 and 32 cross over in order that a body shall be transferred from the one conveying system to the next.

At the cross over the wheel track 12 is disposed with regard to the conveyors 18 so as to raise the wheels 9 in relation to the conveyors 18 and thereby disengage the trunnions 7 of the wheels progressively from the axle bearings on the conveyor. The progressive disengagement is indicated by the circles in chain lines, indicated at 7a in Figure 6, until the dogs on the conveyor 18 can pass under the trunnions 7. At such time the trunnions 7 are brought into the path of dogs on the second conveyor 32 so that a pair of trunnions released from the conveyor 18 is taken over by the dogs on the conveyor 32, and the track 12 is so formed in relation to the path of the conveyor 32 as to take charge of the wheels until the conveyor 32 takes over and so as progressively to lower the trunnions 7 into the axle bearings of the conveyor 32. Successive positions of the trunnions thus being lowered on to the conveyor 32 are shown by the circles formed in chain lines and indicated at 7b in Figure 6. From the foregoing, it will be observed that the trunnions and the sprocket teeth have sufficient dimensions to engage respectively both conveyor bearings and the corresponding racks, the dogs emanating from each of the axle bearings being constructed so that at the cross over an axle is still supported by the leading dog when it clears the following dog of the same bearing.

By such arrangement of the wheel tracks 12 and cross over of the upper runs of the conveyors 18 and 32, a body is transferred from one system to the other. By such a cross over arrangement the cost of a plant may be considerably reduced. The short plates 20 carrying dogs 20b employed on the conveyor 32 are placed along the conveyor at intervals such that bodies picked up by the conveyors are packed as close together as possible while passing through the oven, hence the shortest length of oven commensurate with avoiding one vehicle body splashing another is employed.

As indicated at 33 the floor may be formed with a pit in order that a vehicle body passing through the oven may clear the canopy at the discharge end of the oven, which end of the canopy depends down to the floor level of the oven in order to prevent direct entry of cold air.

In Figures 3, 3a and 4 and 4a of the drawings, the conveyors 18 and 32 are shown as carried on toothed wheels 35 which guide the upper run of each in a path which follows the tracks 12, some of the wheels 35 are driven but the driving means are not shown. The wheels 35a have their bearings adjustably mounted so as to act as take-up wheels, as is indicated by showing a second position for each such wheel.

Clearly the installation described may be modified by including two rinsing tanks 1a and two rinsing tanks may be interposed to follow the tank 1b, the nature of the rinsing liquids depending, of course, on the composition of the liquid used in the tank 1b to produce the protective coating.

In the production of a satisfactory protective chemical coating it is necessary to obtain a solid homogeneous coating and such a result is not obtained if the protective liquid is applied to a coating derived from protective liquid which has already dried on the body. In such case layering occurs which eventually results in flaking. In the construction shown in Figures 3 and 3a the tank 1c normally containing the rinsing liquid, may instead contain the protective coating liquid in which case and as it precedes the drying oven 30 and as there is a tendency for heat from the drying oven to travel by convection currents or radiation to the atmosphere above the tank 1c, there is provided in accordance with the present invention, over the tank 1c, liquid pouring means in the form of a series of lines of sprays arranged transversely of the tank and connected to two pairs of headers 34 running lengthwise of the tank, as shown in Figure 3a. The liquid in the tank 1c may be circulated up to the headers so as to flow from the sprays and maintain wet the part of the surface of the vehicle body which has risen out of the tank 1c.

In the employment of certain protective chemical coating liquids there is a tendency for drying to commence before the requisite thickness of coating is obtained, particularly following a first immersion, so that instead of a solid homogenous protective coating being produced a layering occurs which in practice is found to result in flaking. This tendency is aggravated where the coating is effected in apparatus in which a drying stage follows a coating stage because of the unavoidable heating of the atmosphere above the tank containing the coating liquid, due either to convection currents or to radiation.

Experiments have shown that by the method of forming a protective coating, which involves the concomitant use of a partial immersion process and spray process, that the time taken to provide the protective coating can be reduced to one third of the time usually taken to produce a similar coating by successive submersions, and moreover that a smooth coating is obtained by reason of the production of a gentle rain of the liquid in contradistinction to power jets of the liquid. The rain falling gently on to the body being treated effects a drenching of the body and a substantially continuous flow of the treating liquid over the body which is raised above the level of the liquid, and apparatus according to the present invention enables a method of producing a protective chemical coating on vehicle bodies formed from sheet metal to be effected in which, as claimed in application Serial No. 8,835 aforesaid, each body is continuously rotated at the same speed about a horizontal axis arranged lengthwise of and intersecting the body and the vehicle body advanced so that only a longitudinal section thereof is immersed in the coating liquid, while the upper part of the body is exposed to a rain of the liquid, whereby drying of the coating liquid is prevented until the end of the treatment and an even distribution of the coating liquid over the body is obtained and standard form of product produced.

As shown in Figure 3a the tank 1c may be provided with a sump 40 and a partition 41 extending right across the tank and downwardly for such distance as to provide an inlet 42 from the tank to the sump, this partition having an inclined baffle 43 extending right across the tank. That part of the liquid above the sump 40 is used to feed a pump 40a which takes the liquid up to the header 34 and thence to the series of lines of sprays, thereby liquid in the tank is pumped up to the headers which feed the piping which is perforated to form the series of sprays as will be well understood, the spray falling as a rain over the liquid in the tank.

Apparatus constructed according to the invention can be operated at a high speed and by "high speed" is meant the treatment of bodies at a rate exceeding 250 bodies per 8 hour shift, while at all times the weight of the bodies is taken by the wheels 9 so that the conveyor mechanism is not subject to excessive wear, and accordingly the maintenance cost thereof is relatively low.

The final coating may be applied in any well known way but preferably, as indicated in Figure 7, the coating is produced by partially submerging the vehicle body as already described with reference to the cleaning of the body and the formation of the protective coating. In Figure 7 the tank containing the priming coating is indicated at 1d, a draining run at 36 and a second drying oven at 30a, the discharge end of the installation being in Figure 7 indicated at B¹. The oven 30a may be constructed in exactly the same manner as the oven 30.

In the arrangement shown it will be observed that the vehicle bodies dip one at a time into a relatively small capacity prime coating tank, so that though the bodies on the conveyor 32 are closely packed as compared with those on conveyor 18, they cannot splash one another. This small capacity tank is however, particularly advantageous in the case of expensive paints from the point of view of costs. Moreover the relative shallowness of the paint in the tank lessens the tendency to settlement or separation when the paint used contains thinners or pigments or other solids in suspension. Further a small capacity tank makes it easier to maintain in good condition the paint, which is used in relatively small quantities, as compared with the quantities used when a vehicle body is completely submerged. By controlling the ambient temperature and the viscosity and density of the paint in the tank 1d the thickness of the prime coat may be regulated. The paint in the tank 1d may be heated by pipes passing under the tank or through the tank as will be well understood. Alternatively, the paint may be heated on its way to the sprays.

After leaving the tank each body passes through a draining run under which is a drain tray 37 which collects paint dripping from the bodies and allows the paint to be delivered to a sump 38 from whence it may be re-delivered by a pump (not shown) to the paint tank 1d. As in the case of the tank 1c, when carrying the protective coating liquid in order to avoid layering of the paint on the body, there may be disposed over the tank 1d a series of spray lines fed from a header, indicated at 34a. In a modified arrangement the prime paint may be applied to the body as it pauses over the tank 1d from overhead sprays fed from the headers 34a in which case the tank 1d acts as a collector and the paint received in the tank 1d is pumped back into the spray lines as will be well understood.

The vehicle body having been painted and drained passes into the drying oven indicated at 30a, and thence to the delivery end of the installation at B¹.

Various modifications may be made in the construction described without departing from the present invention, for example, instead of employing tanks made of sheet metal, the tanks may be in the form of excavations provided with a suitable lining and the wheel tracks and racks can then be mounted in trenches run alongside the pits thus formed, and the term "tank" used herein is intended to include both built up and excavated containers.

Further, although a cradle which is in part built on the vehicle body and in part fixed to the trunnions is herein described as the means of securing a vehicle body to the conveying system, a complete cradle may be utilised which comprises a U-shaped frame connected to the trunnions and lateral extensions at the bottom of the frame devised to receive the body, or any other form of jig may be employed, for example the jig may be of basket or crate form, and such other constructions are intended to be included in the term "cradle" used in this specification.

Moreover a homogeneous protective coating may be obtained on both the exterior and the interior of the body in accordance with the invention.

We claim:

1. Apparatus for automatically treating with liquids both the interior and exterior surfaces of automobile bodies or the like, comprising a tank for containing a liquid, a carriage including a support for removably receiving a body to be treated and mounted for rotation about an axis that is substantially longitudinal of and intersecting the body, a conveyor extending past said tank and including means for movably supporting said carriage with its axis of rotation in a substantially horizontal plane when the carriage is in the middle of the tank, said conveyor including means for advancing said carriage and means for rotating the body support as said carriage is advanced, and a dip in said conveyor supporting means immediately adjacent said tank to lower the carriage, as it is advanced, into said tank for at least partially submerging the mounted body in the tank-contained liquid and with said axis of rotation substantially horizontal and then raise the carriage to pass beyond the tank.

2. Apparatus according to claim 1, including spray producing means disposed over said tank above the path of said carriage, and means for supplying said spray producing means with liquid from said tank.

3. Apparatus for automatic treatment of automobile bodies inside and outside by liquids, such as cleaners, rust-proofers, primers, and paints, comprising at least one tank containing treating liquid, a plurality of body-carrying frames, each for rotatively mounting an automobile body, conveyor means supporting said frames and including a track and conveyor travelling on the track, the conveyor having a forward travel past said tanks and above the ends of said tanks and at each tank said track and conveyor having dips so that the conveyor travel lowers the body frames into at least partial submersion as it travel and rolls into, through and out of the liquid in a tank, and means for rotating the body carrying frames and the bodies as they move along the conveyor iinto, through and out of a tank, the axis of rotation of the body carrying frame and body being, when the body is in the middle of the tank, approximately parallel to the surface of the liquid in the tank when the liquid is quiescent so that while going through the tank, body surfaces including the inside surfaces, are part of the time exposed above the liquid but eventually all parts of the body turn into and pass through the liquid.

4. The combination claimed in claim 3, in which the track and conveyor are disposed relative to said tanks to support the axis of rotation of said frames at all times above the surface of the liquid but immediately adjacent the quiescent surface thereof so that the complete inside and outside surface of the body turns and travels through the liquid in the tank.

5. The combination claimed in claim 3 in which a body carrying frame is a cradle to which the body is temporarily firmly fixed.

6. Apparatus according to claim 3, including spray producing means disposed over said tank above the path of said body carrying frames and means for supplying said spray producing means with liquid from said tank.

7. Apparatus for treating a sheet metal vehicle body with a liquid, comprising a rotatable mounting for the body, coaxially disposed axles respectively at each end of said mounting, a pair of wheels respectively journalled on said axles, means on said mounting for securing a vehicle body thereto with the axes of the axles intersecting the body longitudinally thereof, a treating liquid tank dimensioned to receive at least a portion of a body on said mounting, tracks supporting said wheels and extending past said tank, said tracks having inclined portions adjacent each end of the tank and portions adjacent the sides of the tank and connecting the lower ends of the inclined portions to lower a body at least partially into the tank with the axes substantially horizontal as its mounting passes over the tank and then raise the body to pass over the end of the tank, endless conveyors alongside each track, means on each conveyor for respectively engaging the axles to move the mounting along the track, a rack mounted adjacent each track and means respectively connected to said axles for engaging said rack for rotating the mounting as it is advanced by the conveyors along said tracks, and motive means for said conveyors, whereby the body is progressively dipped into the liquid as the mounting is rotated while advanced across the tank.

8. Apparatus according to claim 7 for treating a sheet metal body with a liquid to form a protective chemical coating on the body, the coating liquid being contained in said tank, including spray producing means disposed over said tank above the level of said mounting and means for supplying said sprays with the coating liquid in said tank, and the level of the treating liquid in the tank being such that as the body is advanced a longitudinal section only of the lower part of the body is immersed in the liquid in said tank and the exposed upper part of said body is continually wetted by treating liquid pouring from said sprays.

9. Apparatus for treating sheet metal vehicle bodies with different treating liquids in succession, comprising an aligned series of tanks for containing the treating liquids, tracks extending past said series of tanks and respectively mounted alongside each of the tanks, driven endless conveyors respectively running alongside said tracks, a series of rotatable mountings, a pair of coaxial wheels journalled on each end of each mounting and respectively mounted on said tracks, means for securing a vehicle body on each mounting to locate the body so that the axes of said wheels longitudinally intersect the body, spaced means on the conveyors for engaging the respective sides of the mountings to advance said mountings in succession along said tracks, corresponding dips in the tracks respectively adjacent said tanks to lower the mountings at least partially into the tanks and then raise said mountings to pass over the ends of the tanks as said mountings are advanced, and means for rotating each mounting as it is advanced by the conveyors.

10. Apparatus according to claim 9, wherein said means for rotating each mounting comprises a toothed wheel fixed on one corresponding end of each mounting, each of the toothed wheels being of the same diameter, and a fixed rack disposed alongside the respective wheel track located to engage each of the toothed wheels, whereby, as a consequence of the mountings being advanced by the conveyors, the mountings are rotated by the toothed wheels running on the racks.

11. Apparatus for treating sheet metal bodies with treating liquids in succession according to claim 9, including spray producing means disposed over some of said tanks above the level of the said mountings, and means for supplying said sprays with liquid on the respective tanks, the level of the treating liquid in said respective tanks being such that as the body is advanced a longitudinal section only of the lower part of the body is immersed in the liquid in said tank and the exposed upper part of said body is continually wetted by treating liquid pouring from said sprays.

12. Apparatus for treating sheet metal vehicle bodies with a treating liquid, comprising a cradle, means for securing a vehicle body on said cradle lengthwise thereof, a trunnion projecting from each end of the cradle, the axes of the trunnions passing substantially longitudinally through a vehicle body when secured to the cradle, a wheel running freely on each trunnion, a pair of parallel tracks respectively supporting said wheels with said cradle disposed transversely therebetween, a tank for the treating liquid between the tracks and adapted to receive said cradle, said tracks being positioned relative to the top of the tank and said wheels having a radius to position said trunnions just above the top of the tank when the wheels are on the tracks, a toothed wheel fixed on one of said trunnions, a rack fixed alongside the respective track to engage said toothed wheel, an endless conveyor at each side of the tank, open bearings on said conveyors to respectively seat said trunnions and move them with the conveyors, and motive means for said conveyors, the tracks for the wheels being inclined upwardly and downwardly respectively adjacent the ends of the tank to cause the cradle to rise above each end of the tank as it moves along said tracks.

13. Apparatus according to claim 12, comprising a plurality of said cradles, an aligned series of said tanks, endless conveyors successively disposed along opposite sides of the series of tanks and in substantially parallel relation to said tracks, the ends of said conveyors being respectively juxtaposed in crossing relation, the upper runs of the juxtaposed end portions of the successive conveyors crossing one another with the end portion of the preceding conveyor descending and the end portion of the succeeding conveyor ascending, said tracks and conveyor upper runs converging toward each other under the points of crossing of said conveyors, whereby as the trunnions approach the points of crossing they are progressively elevated and lowered by the track relative to the open bearings, and dogs projecting from opposite ends of the open bearings at different heights, the leading dog being higher on the open bearings of the descending conveyor and the trailing dog being higher on the open bearings of the ascending conveyor and at the cross-over a trunnion is engaged by a higher dog even though it clears the lower dog of the same bearing, whereby the higher trailing dog of the bearings on the ascending conveyor will engage the trunnion and advance it until the trunnion is seated in said bearings.

14. Apparatus according to claim 13, comprising a drying tunnel aligned with said tanks with the last of said endless conveyors extending through said drying tunnel, said open trunnion bearings of the conveyors alongside the tanks being relatively widely spaced to avoid one cradle splashing another, and the trunnion bearings of the conveyor through the drying tunnel being relatively closely spaced to the limit permitting rotation of the cradles.

15. Apparatus according to claim 12, comprising a tank which is shallow as compared with the height of a vehicle body so that the level of the liquid in the tank is such that a vehicle body suspended in the tank by the cradle is disposed so that the lower portion of the body dips into the liquid as the cradle is rotated and advanced along the tank by the conveyor.

16. Apparatus according to claim 12, for treating sheet metal bodies in which the cradle comprises two opposed L-shaped members having upright branches and aligned horizontal branches with the free ends of the horizontal branches facing each other in opposition but adjacent each other, said L-shaped members having means mounted on said horizontal branches for supporting a chassis frame member of a vehicle body so that the two L-shaped members are connected together through the vehicle body mounted between them, said trunnions being fixed in axial alignment to the upright branches of said L-shaped members.

GETHIN WILLIAMS.
        ALEXANDER PROUD FOWLER.

REFERENCES CITED

The following references are of record in the file of this patent:

UNITED STATES PATENTS

| Number | Name | Date |
| --- | --- | --- |
| 1,872,507 | Saunders et al. | Aug. 16, 1932 |
| 1,923,663 | Coda | Aug. 22, 1933 |
| 2,103,901 | Gordon | Dec. 28, 1937 |
| 2,336,401 | James | Dec. 7, 1943 |
| 2,370,083 | Smith | Feb. 20, 1945 |